# 3,009,414
CAN CRUSHER
Karl H. Griemert, Box 308, Rte. 3, McHenry, Ill.
Filed Aug. 25, 1958, Ser. No. 757,059
5 Claims. (Cl. 100—293)

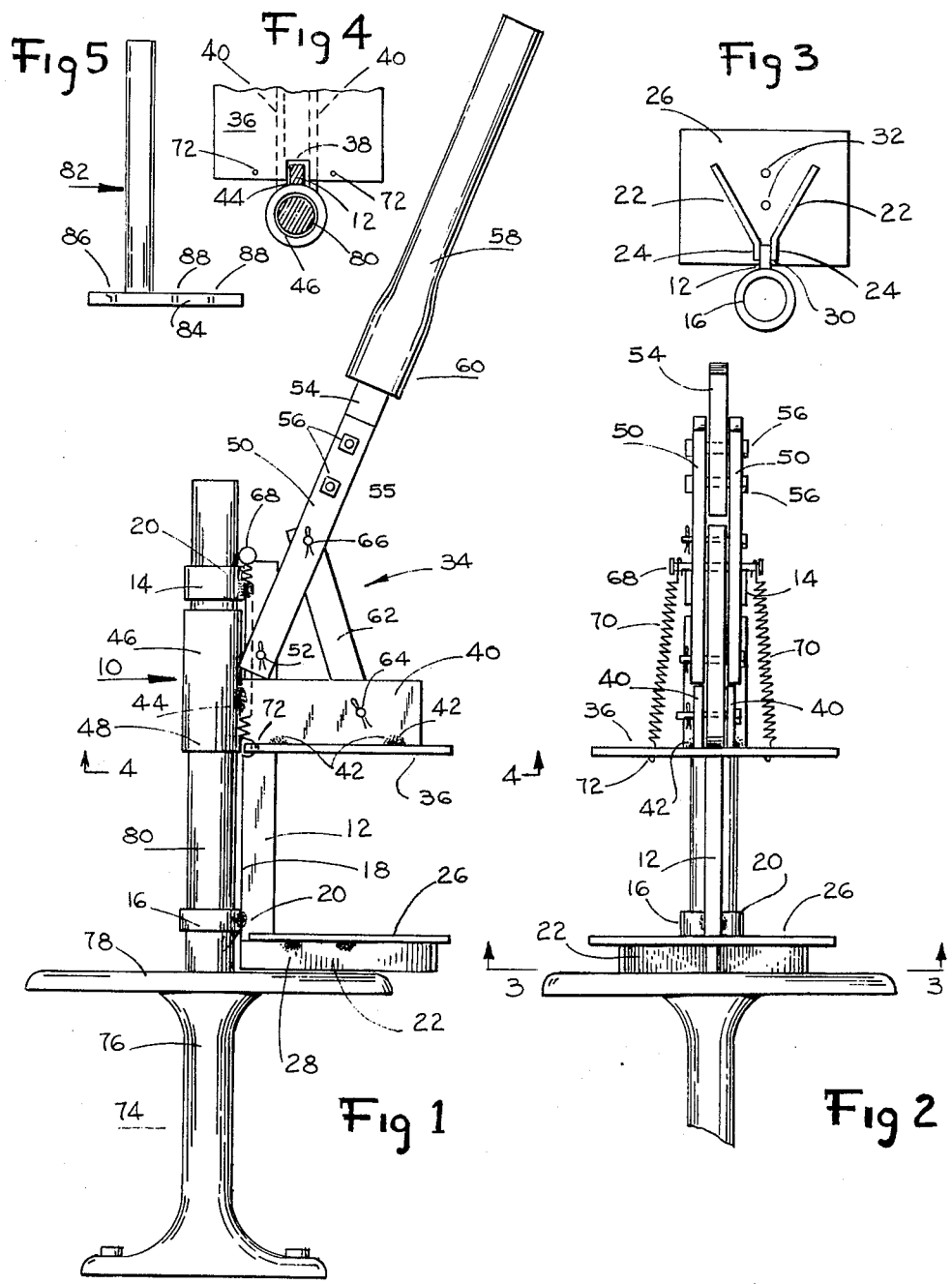

My invention relates to a can crusher and more particularly to a can crushing accessory for a tire stand and the like.

Filling stations, garages, etc. are plagued with a major trash problem in that so many of the products which they sell in large quantities such as lubricating oil, antifreeze, etc., come packaged in metal containers which, as is well known, are exceedingly bulky and soon overload trash storage facilities on the premises. This problem, or the related problems as they occur in restaurants, households, etc., has engaged the attention of many people and many devices have been developed for collapsing the containers in order to consume less trash storage space.

Most of these structures have been independent items of equipment occupying floor or bench space and, by virtue of the high order of force required to collapse a container of this sort, have been either relatively massive pieces of equipment or the art indicates that the devisors thereof had an insufficient appreciation of the difficulty involved.

The device of my invention is directed rather specifically to filling station or garage use or more generally is directed to primary employment in a shop where a tire stand or comparable piece of apparatus is available.

As stated, in order to crush metallic containers, a relatively high order of force is required and consequently the basing or "foundation" of a device intended for crushing cans must be heavy enough or securely enough fixed so as to be immovable under the forces applied. Some can crushers have avoided application of great pressures by calling for the removal of the ends of the container before crushing it and such a demand is quite reasonable in a household context. In a filling station, however, tools for removing the ends of cans are not at hand and the removal of the ends is simply another time consuming action and additionally divides a single piece of trash into three pieces.

In order to anchor the can crushing device adequately, therefore, the teaching has been to provide either a massive base or a base securely bolted to the floor or a bench. In such cases valuable floor or bench space is consumed, already crowded working conditions are further crowded and the device is either immovable or movable only with great difficulty.

My invention is directed to a can crusher intended as an accessory to a tire stand or any device affording a firmly moored upright post. Other possible mounts for my device which occur to me are drill press stands or the stands now available on the market for receiving electric drills and thus converting them to drill press purposes. By the use of the tire stand, for instance, which is an exceedingly heavily based piece of apparatus and already occupying its own floor space, I am able to avoid any floor space being occupied by an additional can crushing device. Likewise, by employing so substantial a structure, the can crushing unit of my invention may be relatively light and easily handled as for placing the device on the tire stand or removing it therefrom for storage. The device likewise may be compact so as to occupy small storage space and again its weight is such that it may be stored on a shelf rather than occupying bench or floor space. My device is one which may simply be dropped on a post such as a tire stand possesses and need not otherwise be secured thereto in any other way. Finally, the accessory of my invention is simply and inexpensively constructed, is foolproof in operation and is adequate to withstand any forces applied in the course of crushing metal containers.

Other objects and advantages of my invention will be apparent from the following description and drawings, of which:

FIG. 1 is a side elevation of a preferred embodiment of my invention illustrated as mounted on a tire stand;

FIG. 2 is a front elevation of the device of FIG. 1;

FIG. 3 is a bottom view of the anvil of the can crusher and may be regarded as being taken from the line 3—3 of FIG. 2, looking in the direction of the arrows;

FIG. 4 is a fragmentary view of the underside of the movable jaw of my invention taken substantially along the line 4—4 of FIG. 1, looking in the direction of the arrows; and FIG. 5 is a stand which may be provided to be used in conjunction with the can crusher of my invention in circumstances where a tire stand or its equivalent are lacking.

The can crusher 10 of my invention is composed generally of heavy metal parts, either plate or tubular stock such as pipe sections or the like. It includes a vertical frame member 12 formed of heavy rectangular bar stock. Upper and lower post mounts 14 and 16, consisting of short sections of heavy pipe or equivalent sleeving material, are welded on their outside surfaces against the rear edge 18 of the frame member 12 as at 20 so that the apertures thereof are in vertical alignment with each other.

The frame member 12 likewise has a pair of anvil braces 22 welded at one end flat against the sides of the frame member 12 at the lower end thereof to extend forwardly therefrom. The anvil braces are so bent next to the area of welding 24 as to diverge from each other at a substantial angle. The anvil braces may be formed of heavy plate and are generally rectangular in section.

I provide a flat, rectangular heavy plate 26 which constitutes the anvil of my can crusher and which is secured against the top edges of the anvil braces 22 as by welding 28 along meeting surfaces of the braces and underside of the anvil. The anvil is notched out as at 30 centrally along its back edge so as to accommodate closely the forward edge of the main frame member 12. The anvil may have holes 32 therethrough for securing the can crusher to a base as will be subsequently described.

My device likewise includes a movable jaw assembly 34. This assembly includes a jaw plate 36 substantially identical with the anvil 26 and arranged directly above the anvil. The jaw plate is notched out as at 38 similarly to the anvil to accommodate the main frame member 12. A pair of relatively wide brace plates 40 are welded on their lower edges as at 42 to the upper surface of the jaw plate 36 to extend forwardly on the jaw plate parallel to each other and spaced from each other to accommodate the main frame member 12 therebetween. The brace plates extend slightly beyond the rear of the jaw plate 36 as at 44.

A relatively long sleeve 46 is welded to the outwardly extending ends 44 of the brace plates 40 with the bottom edge 48 thereof flush with the undersurface of the jaw plate 36, the sleeve 46 extending perpendicularly to the plane of the jaw plate. The sleeve 46 may have the same internal and external diameters as the post mounts 14 and 16 and is axially aligned therewith.

It will be noted that the movable jaw assembly is slidably but securely assembled to the stationary members of my invention or those parts carried by the main frame member. The main frame member 12 is received in notch 38 in the jaw plate and lies between the forward end of the notch 38 to the front, the sleeve 46 to the rear and between brace plates 40 on its sides. Thus the movable jaw assembly encompasses and is slidably secured to the main frame member 12, and the movement of the movable jaw assembly is limited by the movement of the sleeve 46 between the upper and lower post mounts 14 and 16.

To complete the structure my device includes a pair of arms 50 which are pivotally secured on opposite sides of the main frame member 12 adjacent the upper end thereof by a pin 52 extending through appropriate bores in the ends of the arms 50 and in the main frame member. A tongue 54 is secured by bolts 56 between the arms 50 adjacent the outer ends thereof to extend beyond the ends thereof. The tongue is about equal in thickness to the main frame member 12 so that the arms 50 are supported in spaced parallel relation to provide an aperture between the rear end 55 of the tongue 54 and the main frame member 12.

The tongue 54 and arms 50 together constitute a handle. A handle extension 58 may likewise be provided in order to increase the leverage applicable to the crushing operation which may consist of a pipe or similar tubular structure having a flattened end 60 which fits closely over the outwardly extending end of tongue 54.

A toggle 62 is pivotally contained at its lower end between the brace plates 40 as by pin 64 extending through appropriately aligned bores, and the upper end of the toggle is pivotally contained in the aperture between the arms 50 again by a pin 66 extending through appropriate bores.

To complete my assembly a cross pin 68 headed at both ends may be secured across the top of the main frame member 12 adjacent the rear edge thereof and a pair of tension springs 70 are secured at their upper ends to the cross pins and at their lower ends in appropriate bores 72 in the jaw plate 36. The tension springs are sufficiently strong so as to overbalance the weight of the movable jaw assembly 34 together with the handle and handle extension so as to support the structure normally in the position illustrated in FIG. 1. The ends of the cross pin 68 and the bores 72 are situated well to the side of the braces 40 and associated structure so as to avoid any interference as between the springs and the structure contained between them.

The use of the device will be readily appreciated from the drawings. In FIG. 1 the illustrated embodiment of my invention is shown mounted on a tire stand 74 including a pedestal 76 having a large flat round top 78 and a post 80 standing up from the center of the surface 78. In FIGS. 1 and 2 the device has simply been fitted over the post 80 of the tire stand by sliding the post mounts 14, 16 and the sleeve 46 thereover, the device coming to rest on the tire stand by the anvil braces 22 meeting the top 78 of the tire stand. The handle extension 58 is shown mounted to the handle for maximum application of leverage. In this condition a can may be inserted between the anvil and the movable jaw 36 and pressure applied by the handle extension to crush the can. It will be appreciated that no fixed attachment to the tire stand need be made and that enormous leverage may be applied by virtue of the sturdiness and firmness of the tire stand. To remove the device from the tire stand for storage the handle extension may be removed and the can crusher simply lifted off post 80. In such condition it is neither bulky nor heavy and may be stored with the greatest convenience.

Where tire stands are not available, a stand 82 such as that illustrated in FIG. 5 may be employed. Such a stand should include a base 84 which desirably has provision for anchoring it to a surface as by pre-formed screw or bolt holes such as the hole 86. In such an instance as may occur in a rather crowded shop, it may be desirable to fix the can crushing unit to the stand in order to limit the area of operation of the device and also to insure proper pressure application relative to the orientation of the base 84 of the stand and the nature of its attachment to the surface on which it rests. For these reasons I provide the counter-sunk bores 32 in the anvil and corresponding tapped holes 83 in the base 84 of the stand 82 to receive heavy machine screws.

It will be noted that the sleeve 46 extends substantially above the brace plates 40 and that the main frame member 12 extends substantially above the point of attachment 52 of the handle to the main frame member 12. In this fashion the upper post mount 14 is spaced well above the point of handle attachment 52. By these means, a full lift of the movable jaw is permitted to the point at which it encounters the handle 50. At the same time, the substantial length of the sleeve makes for smooth movement thereof on post 80 without the binding which might be expected from torque imposed on the sleeve in the course of can crushing. It will likewise be appreciated that the lower end of the toggle is connected to the brace plates 40 at a point approximately overlying the center of the movable jaw so as to minimize the torque of the crushing process.

It will be appreciated from the foregoing description that a device constructed in accordance with my invention is adequately sturdy for its stated purpose of crushing cans so as to conserve trash storage space and permits a high degree of leverage for this purpose and yet is such that it may be easily and compactly stored when not in use. It demands no permanent floor or bench space. It is strongly and simply constructed of conventional materials.

It will further be evident from the foregoing description that I have described an embodiment only of my invention and that many alternatives as to structure lie within the purview of my invention, and I, therefore, desire that my invention be regarded as being limited only as set forth in the following claims.

I claim:

1. A can crushing accessory for use with a tire stand or the like characterized by a firmly anchored upstanding post comprising a main frame having sleeves on one side thereof at its upper and lower ends to fit on said post and an anvil extending outward from the lower end thereof oppositely to said sleeves, a movable jaw assembly slidable on said frame and including a jaw opposing said anvil and a sliding sleeve having an interior diameter equal to the interior diameter of said frame sleeves and secured to the back side of said jaw in vertical alignment with said frame sleeves, operating means including an arm pivoted to said frame at one end and a link interconnecting said jaw and a point on said arm spaced on said end and resilient means normally maintaining said jaw in a position spaced from said anvil.

2. A can crushing accessory for use with a tire stand or the like characterized by a firmly anchored upstanding post comprising a main frame having sleeves at the upper and lower ends thereof to fit on said post and an anvil extending outward from said frame, a movable jaw assembly encompassing said frame between said sleeves and including a jaw opposing said anvil and a sliding sleeve having an interior diameter equal to the interior diameter of said frame sleeves and in vertical alignment with said frame sleeves, operating means including an arm pivoted to said frame and connected to said jaw to move said jaw toward said anvil, and resilient means normally maintaining said jaw in a position spaced from said anvil.

3. A can crushing accessory for use with a tire stand or the like characterized by a firmly anchored upstanding post comprising a main frame having sleeves at the upper and lower ends thereof to fit on said post and an anvil extending outward from said frame, a movable jaw assembly encompassing said frame between said sleeves and including a jaw opposing said anvil and a sliding sleeve having an internal diameter equal to the interior diameter of said frame sleeves and in vertical alignment with said frame sleeves and operating means including an arm pivoted to said frame and operatively connected to said jaw to move said jaw toward said anvil.

4. A can crushing accessory for use with a tire stand or the like characterized by a firmly anchored upstanding post comprising a vertical main frame having sleeves on one side thereof at its upper and lower ends to fit on said post and an anvil extending outward from the other side at the lower end thereof, a movable jaw assembly comprising a jaw opposing said anvil apertured at its rear edge to encompass said frame and a sliding sleeve having an internal diameter equal to the interior diameter of said frame sleeves and secured against said rear edge of said jaw face in axial alignment with said frame sleeves to enclose said frame within said aperture, operating means including an arm pivoted to the upper portion of said frame at one end and a link interconnecting said jaw assembly and a point on said arm spaced from said end and a tension spring interconnecting said jaw assembly and the upper portion of said frame to maintain normally said jaw in a position spaced from said anvil.

5. A can crusher comprising a firmly anchored, vertical post, a main frame having upper and lower sleeves secured thereto and encircling said post and having an anvil extending outwardly from said post at the lower end thereof, a movable jaw assembly including a sleeve of substantial length slidable on said post, a pair of spaced vertical parallel plates extending outwardly from the lower end of said sleeve to enclose said frame therebetween and a jaw secured to the underside of said plates oppositely to said anvil, an operating lever to move said jaw toward said anvil pivoted at one end to said frame substantially below said upper sleeve and above said plates, a link connected at one end to said lever and at the other between said plates, and resilient means normally supporting said jaw in a position spaced above said anvil and the upper end of said jaw assembly above said point of attachment of said lever to said frame and close to the lower edge of said upper frame sleeve.

References Cited in the file of this patent
UNITED STATES PATENTS

| | | |
|---|---|---|
| 220,654 | Payton | Oct. 14, 1879 |
| 2,128,630 | Wright | Aug. 30, 1938 |
| 2,150,812 | Aukerman | Mar. 14, 1939 |
| 2,563,379 | Smith | Aug. 7, 1951 |
| 2,842,191 | Coats | July 8, 1958 |